(12) United States Patent
Huynh

(10) Patent No.: US 8,042,575 B2
(45) Date of Patent: Oct. 25, 2011

(54) SPRING ENERGIZED PLUG

(75) Inventor: Gabriel T. Huynh, Garden Grove, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 140 days.

(21) Appl. No.: 12/666,079

(22) PCT Filed: Jun. 27, 2008

(86) PCT No.: PCT/US2008/068572
§ 371 (c)(1),
(2), (4) Date: Dec. 22, 2009

(87) PCT Pub. No.: WO2009/003166
PCT Pub. Date: Dec. 31, 2008

(65) Prior Publication Data
US 2010/0175770 A1  Jul. 15, 2010

Related U.S. Application Data

(60) Provisional application No. 60/946,420, filed on Jun. 27, 2007.

(51) Int. Cl.
*F16L 55/10* (2006.01)
(52) U.S. Cl. ............ 138/89; 138/90; 215/273; 220/319; 220/326; 220/23
(58) Field of Classification Search ............ 138/89, 138/90; 215/273, 364, 279, 280, 287; 220/319, 220/326, 240, 233
See application file for complete search history.

(56) References Cited

U.S. PATENT DOCUMENTS

| 2,694,406 A | | 11/1954 | Ayers | 137/115.03 |
| 3,155,116 A | * | 11/1964 | Ver Nooy | 138/89 |
| 3,613,936 A | * | 10/1971 | Kaiser et al. | 220/237 |
| 3,821,970 A | | 7/1974 | Affa | 138/89 |
| 4,100,629 A | * | 7/1978 | Jones et al. | 4/295 |

(Continued)

FOREIGN PATENT DOCUMENTS

DE   36 35 264   4/1987

(Continued)

OTHER PUBLICATIONS

PCT/US2008/068572; PCT International Search Report and Written Opinion mailed Nov. 5, 2008.

*Primary Examiner* — Patrick F Brinson
(74) *Attorney, Agent, or Firm* — Renner, Otto, Boisselle & Sklar, LLP

(57) ABSTRACT

A self-contained cartridge sealing plug that does not require any torque settings. The sealing plug includes a cylindrical-shaped plug body that carries an O-ring seal. The bottom of the plug body has a hole where a spring is inserted and retained by a spring retainer that locates the spring and/or functions as a backstop for the spring that preloads the plug body against a retaining member. The spring-loaded action allows the plug body to be inserted into a-non-threaded cavity and depressed past a groove in the cavity. Once the shoulder on the plug body passes the groove, a wire ring retainer including one or more arcuate segments can be inserted into the cavity. The spring energy is then released against the ring retainer, retaining the plug body in the cavity.

18 Claims, 2 Drawing Sheets

U.S. PATENT DOCUMENTS

| | | | | |
|---|---|---|---|---|
| 4,144,909 A | * | 3/1979 | Harrison | 138/94 |
| 4,188,675 A | * | 2/1980 | Ast | 4/295 |
| 4,542,852 A | | 9/1985 | Orth et al. | 236/92 B |
| 4,726,401 A | | 2/1988 | Nagano et al. | 138/89 |
| 5,127,237 A | | 7/1992 | Sendo et al. | 62/225 |
| 5,160,226 A | | 11/1992 | Lee, II | 411/72 |
| 5,474,336 A | * | 12/1995 | Hoff et al. | 285/322 |
| 6,003,557 A | * | 12/1999 | Brelig et al. | 138/89 |
| 6,062,570 A | * | 5/2000 | Erickson | 277/529 |
| 6,155,575 A | * | 12/2000 | Hawkins et al. | 277/591 |
| 6,253,837 B1 | | 7/2001 | Seiler et al. | 165/103 |

FOREIGN PATENT DOCUMENTS

GB     1 261 010     1/1972

\* cited by examiner

SPRING ENERGIZED PLUG

This application is a national phase of International Application No. PCT/US2008/068572 filed Jun. 27, 2008 and published in the English language.

RELATED APPLICATION

The present application claims priority to U.S. Provisional Application No. 60/946,420 filed Jun. 27, 2007, which is hereby incorporated herein by reference.

FIELD OF THE INVENTION

The present invention relates generally to sealing plugs and more particularly to a new sealing plug for sealing access openings and other bores in metal castings, metal forgings and other parts, particularly those exposed to high pressure and/or vibration.

BACKGROUND

A variety of plugs have been designed for sealing hydraulic and other fluid systems, including simple expansion plugs as well as relatively complex plugs. A known expansion sealing plug has a frusto-conical plug body with peripheral U-shaped grooves, an expansion member comprising either an inner wedge pin or a spherical member, and a tapered coaxial bore for receiving the expansion member. The inner wedge pin has a greater average outside diameter and the spherical member has a greater maximum outside diameter than the tapered coaxial bore. The plug body and expansion member are proportioned to be preassembled such that the expansion member is frictionally retained after partial insertion into the plug body. The unexpanded plug is inserted into a counterbore that is reamed or formed with the same taper angle as the plug body and the expansion member is driven axially into the plug such that the plug body is radially expanded to forcibly engage the counterbore.

High system pressures frequently require positive means of retaining the plugs, particularly when the opening to be plugged is large. A large opening results in an increased expelling force exerted on the plug, as a greater surface area is exposed to the system pressure. A commonly used feature of plugs designed to seal large openings under high pressure is to mate male screw threads on the exterior of the plug with female screw threads in the interior of the opening being plugged. The relatively high retention force provided by the mated threads provides the ability to use large plugs that resist expulsion by high system pressures. A difficulty of the use of threaded plugs is that the plugs tend to loosen, allowing the plug to rotate and eventually back out, when the plug and/or the installation site are subjected to vibration.

FIG. 1 shows a prior art sealing plug 10 that uses a threaded cap 12 to secure a plug body 14 in a bore, hole or other opening 16 in a manifold or other part 18. The plug body 14 has a cylindrical shape and carries an O-ring 20 for sealing to the surface of the bore 16. The plug body is inserted into the opening and then secured in the opening by the cap 12 that is externally threaded for engaging internal threads at the outer end of the opening. A lock wire 22 attached to the body 18 is then secured to the cap 12 to prevent the cap from backing out of the hole, as might otherwise occur as a result of vibration.

SUMMARY OF THE INVENTION

The present invention provides a novel and inventive sealing plug for plugging an opening in a part such as a manifold or other fluid member provided with an access passage or other opening that needs to be plugged. Unlike prior sealing plugs, a spring-loaded plug configuration is provided that allows for a smaller package size, less weight and/or easy assembly and/or disassembly. The sealing plug configuration also eliminates the need for a threaded connection between the plug and the part including the opening that is plugged by the sealing plug.

In a preferred embodiment, the sealing plug is a self-contained cartridge plug that does not require any torque settings. The sealing plug includes a cylindrical-shaped plug body that carries an O-ring seal. The bottom (axially inner end) of the plug body has a hole where a spring is inserted and retained by a spring retainer that locates the spring and/or functions as a backstop for the spring that preloads the plug body against a retaining member. A preferred spring retainer also has an attachment feature that keeps spring retainer, plug body and spring together as a cartridge unit. The spring-loaded action allows the plug body to be inserted into a non-threaded cavity and depressed past a groove in the cavity. Once the shoulder on the plug body passes the groove, a wire ring retainer including one or more arcuate segments can be inserted into the cavity. The spring energy is then released against the ring retainer, retaining the plug body in the cavity. The spring rate can be selected to prevent easy removal of the plug body by fingers alone, as well as not to retract due to a system bleed or other vacuum pull on the plug body.

Thus, there is provided a sealing plug that provides one or more of the following advantages depending on the particular application and/or configuration of the sealing plug: reusability, low cost, easy to manufacture, easy to install and/or uninstall, useful in a wide range of conditions, and resists the influence of extraneous vibration.

Accordingly, the present invention provides a sealing plug for sealing an opening in a part, comprising a plug body insertable into the opening for closing the opening; an annular sealing member circumscribing the plug body for sealing to a wall of the part surrounding the opening to prevent the passage of fluid through the opening past the plug body; a backstop having a radially outward flange portion disposed axially inwardly of an axial inner end of the plug body for engaging an axially outwardly facing shoulder surface of the part; and a resilient member interposed between the backstop and the plug body for resiliently biasing the plug body axially outwardly. The plug body has a radially inwardly stepped end forming an axially outwardly facing stop surface for engaging a retainer engaged in and protruding from a radially inwardly opening retainer groove in wall of the part and an axially extending locking surface for preventing the retainer from moving radially inwardly to an extent that would allow retainer to disengage from the retainer groove. The resilient member resiliently biases the plug body from an axial release position for allowing the retainer to be engaged in or disengaged from the retainer groove to an axial locking position for locating the locking surface radially inwardly of the retainer to prevent its removal from the retainer groove.

As is preferred, the backstop (also herein referred to as a spring retainer) may be coupled to the plug body for limited relative axial movement. The backstop may have a stem extending axially outwardly from the flange portion and telescopically movable in the plug body. The stem may have a reduced neck portion and an axially outer radially enlarged head portion forming with the reduced neck portion an axially inwardly facing abutment surface. The plug body may have a larger diameter interior chamber and a reduced diameter neck portion between the interior chamber, with the axial inner end face of the plug body forming an axially outwardly facing abutment surface for engaging the axially inwardly facing abutment surface of the backstop for holding the backstop to the plug body while permitting relative movement therebetween. The reduced diameter neck portion of the plug body may be internally threaded and the axially outer head portion of the stem may be correspondingly internally threaded, whereby the outer head portion of the stem can be threaded into and through the reduced diameter neck portion of the plug body whereby the outer head portion of the stem can be located within the larger diameter interior chamber of the plug body for limited axial movement therein.

The annular sealing member may be a resilient sealing member, such as an O-ring.

The retainer may include one or more arcuate retainer segments, and the retainer groove may be a circumferentially continuous groove.

According to another aspect of the invention, there is provided the aforedescribed sealing plug in combination with the part and the retainer, with the retainer being engaged in the retainer groove, the backstop engaging the axially outwardly facing shoulder surface of the part, and the plug body being resiliently held by the resilient member in its axial locking position for locating the locking surface radially inwardly of the retainer to prevent its removal from the retainer groove.

According to a further aspect of the invention, there is provided a method of installing a sealing plug in an opening in a part for sealing the opening. The method comprises the steps of (a) inserting a plug body into the opening for closing the opening, with an annular sealing member circumscribing the plug body for sealing to a wall of the part surrounding the opening to prevent the passage of fluid through the opening past the plug body;

(b) pushing the plug body further into the opening against a resilient member to allow a retainer to be engaged in a radially opening slot in the part with a portion of the resilient member protruding radially inwardly;

(c) releasing the plug body to allow the resilient member to move the plug body to a position against the retainer, the plug body having a radially inwardly stepped end forming an axially outwardly facing stop surface for engaging the retainer to retain the plug body in the fluid member, and an axially extending locking surface that moves radially inwardly of the retainer to prevent the retainer from moving radially inwardly to an extent that would allow retainer to disengage from the retainer groove.

According to yet another aspect of the invention, a spring-energized plug assembly for a manifold lug having a central passageway with a blind end bore having an outer end and an annular shoulder inwardly spaced from the outer end, where the plug assembly comprises i) a spring retainer having an elongated annular body portion with a central passage, and an enlarged head configured to fit closely against the annular shoulder within the passageway, ii) a plug portion including an annular body portion with a central cavity configured to receive the body portion of the spring retainer, the spring retainer and plug portion including means for retaining these components together, and a spring located between the spring retainer and the plug portion and biasing these components away from one another into a normal configuration, but allowing them to be compressed together, the plug portion including an external annular channel circumscribing the body portion of the plug portion and a resilient annular seal located in the external channel for sealing against internal walls of the passageway, wherein the passageway includes a retaining ring groove toward the outer end of the passageway, and the plug assembly can be located in the passageway and compressed to allow access to the retaining ring groove for locating a retaining means in the groove, with the retaining means sized so as to abut the plug portion when the plug assembly returns to its normal configuration, whereby the plug assembly is retained in the passageway by the retaining means.

Further features and advantages of the present invention will become apparent to those skilled in the art upon reviewing the following specification and attached drawings.

DETAILED DESCRIPTION

Figure 1:
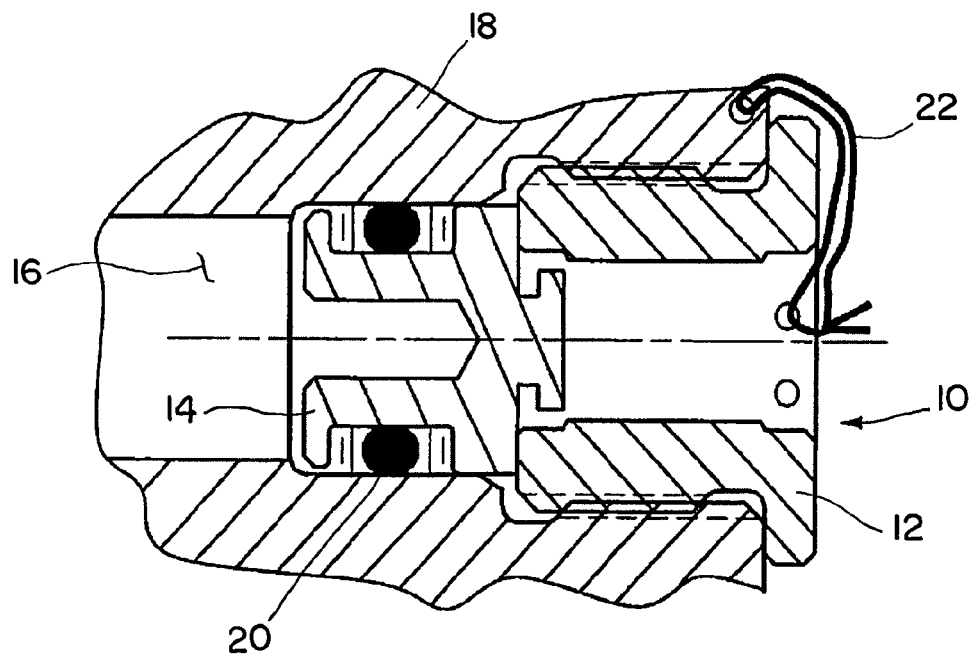
FIG. 1 is a cross-sectional view of a prior art sealing plug.
Figure 2:
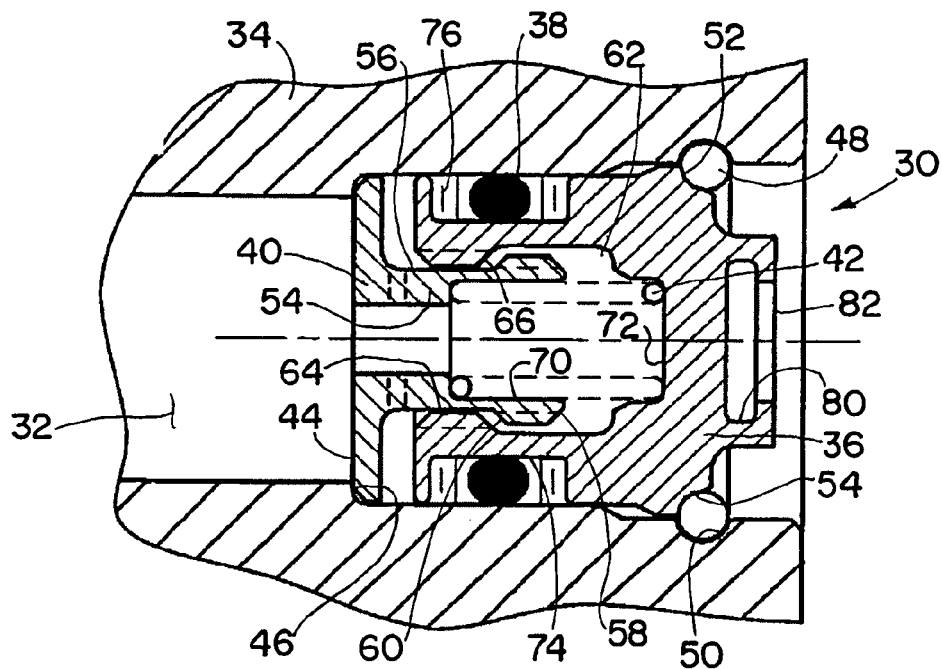
FIG. 2 is a cross-sectional view of an exemplary sealing plug according to the present invention.
Figure 3:
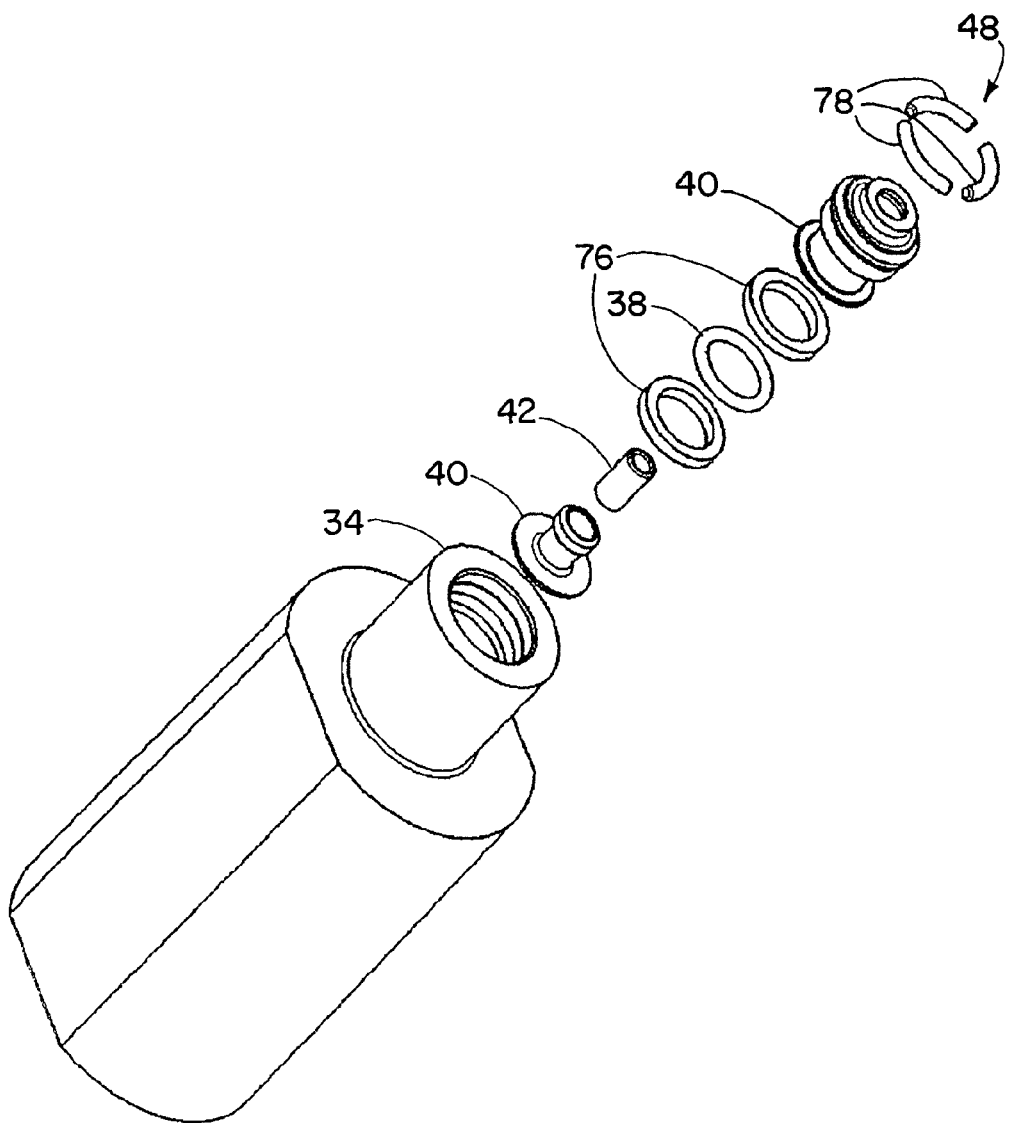
FIG. 3 is an exploded perspective view of the sealing plug of FIG. 2.

Referring now in detail to the drawings and in particular to FIGS. 2 and 3, an exemplary sealing plug according to the invention is indicated generally at 30. The sealing plug 30 may be used to seal a hole, cavity, bore or other opening 32 in a manifold or other part 34. The opening 32 may, for example, be an access opening in a fluid part that needs to be plugged to prevent the escape of pressurized fluid through the opening.

The sealing plug 30 comprises a plug body 36 that is insertable into the opening 32 for closing (plugging) the opening, an annular sealing member 38 circumscribing the plug body for sealing to a wall of the part 34 surrounding the opening 32 to prevent the passage of fluid through the opening past the plug body; a spring retainer 40 that is movable axially relative to the plug body; and a resilient member 42 interposed between the spring retainer and the plug body for resiliently biasing the plug body axially outwardly. The spring retainer 40 has a radially outward extending, annular flange portion 44 disposed axially inwardly of an axial inner end of the plug body for engaging an axially outwardly facing shoulder surface 46 of the part. Thus, the spring retainer functions as a backstop for the resilient member that preloads the plug body axially against a retainer 48 that is engaged in and protrudes from a radially inwardly opening retainer groove 50 in wall of the part 34.

As best seen in FIG. 2, the plug body 36 has a radially inwardly stepped end forming an axially outwardly facing stop surface 52 for engaging the retainer 48 and an axially extending locking surface 54 for preventing the retainer from moving radially inwardly to an extent that would allow retainer to disengage from the retainer groove 50. The resilient member 42 resiliently biases the plug body 36 from an axial release position (shifted to the left from the position shown in FIG. 2) for allowing the retainer 48 to be engaged in or disengaged from the retainer groove 50 to an axial locking position (shown in FIG. 2) for locating the locking surface 54 radially inwardly of the retainer 48 to prevent its removal from the retainer groove 50.

In the illustrated embodiment, the spring retainer 40 is guided by and coupled to the plug body for limited relative axial movement. To this end, the spring retainer has a stem 54 extending axially outwardly from the flange 44 and telescopically movable in the plug body 36. The stem has a reduced neck portion 56 and an axially outer head portion 58 forming with the reduced neck portion an axially inwardly facing abutment surface 60. The plug body has a larger diameter interior chamber 62 and a reduced diameter neck passage 64 between the interior chamber and the axial inner end face of the plug body that form an axially outwardly facing abutment surface 66 for engaging the axially inwardly facing abutment surface 60 of the spring retainer 40 for holding the spring retainer 40 to the plug body while permitting relative movement therebetween.

The reduced neck portion 56 of the spring retainer stem 54 may have a close sliding fit in the reduced diameter neck passage 64 for guiding the spring retainer as it moves relative to the plug body 36.

The reduced diameter neck portion 64 of the plug body 36 may be internally threaded and the axially outer head portion 58 of the stem may be correspondingly internally threaded, whereby the outer head portion of the stem can be threaded into and through the reduced diameter neck portion of the plug body so the outer head portion of the stem can be located within the larger diameter interior chamber of the plug body for limited axial movement therein. Of course, those skilled in the art will appreciate that other means may be employed for providing the lost motion coupling between the spring retainer and plug body. For instance, the axially outer end portion of the stem may be originally sized to pass through the reduced diameter neck portion, after which a suitable tool may be used to radially expand the axially outer end portion of the stem to prevent its withdrawal from the plug body while still permitting limited relative movement.

As also shown, the spring retainer 40 may have a pocket 70 for receiving and locating one end of the resilient member 42 which may be in the form of a spring and in particular a coil spring. The other end of the spring may be received in a locating pocket 72 formed in the plug body 40.

As will be appreciated, a backstop for the spring may be otherwise formed than through use of a spring retainer. For instance, a coil spring may be configured with a radially enlarged axially inner end portion that has a diameter at the end of the spring sufficient to engage the shoulder surface 46. In this case the backstop would be formed with the resilient member as a unitary piece.

The spring retainer 40 may also have one or more through passages for allowing fluid to pass from one side of the spring retainer 40 to the other to allow pressurized fluid in the opening to act on the plug body to assist in holding the plug body in its axial locking position.

Turning now to further details of the illustrated sealing plug 30, the annular sealing member may be a resilient sealing member, such as an O-ring. The O-ring or other resilient sealing member may be retained in an annular groove 74 in the plug body 40. As may be desired particularly with an O-ring, O-ring backup rings 76 may be provided on each axial side of the O-ring in the groove 74.

As will be appreciated, portions of the plug body 40 may be formed as separate pieces. For instance, the sealing groove 74 may be formed in an axially inner part while an axially outer piece has the stepped end for interfacing with the retainer 48.

As best seen in FIG. 3, the retainer 48 may include one or more arcuate retainer segments 78, preferably of circular cross-section. The retainer groove 50 preferably is a circumferentially continuous groove with at least the axially outer side of the groove having an arcuate shape having essentially the same radius as the retainer segment or segments for providing a snug fit between the retainer segments and the axially outer groove wall. As will be appreciated, other types of retainers may be used, such as C-clip.

Turning now to the manner of assembly and disassembly, the sealing plug 30 may be installed in the opening 32 in the part 34 by inserting the plug body 40 into the opening for closing (plugging) the opening. As the plug body is inserted into the opening, the flange 44 of the spring retainer 40 will engage the shoulder surface 46. Further pushing of the plug body into the opening against the biasing force of the resilient member 42 will allow the plug body to move past the retainer groove 50 to permit insertion of the retainer 48 into the retainer groove. The plug body can then be released to allow the resilient member to move the plug body to a position against the retainer to hold the retainer in the groove while the retainer acts to prevent the plug body from being pushed out of the opening. The spring rate of the resilient member 42 can be selected to prevent easy removal of the plug body by fingers alone, as well as not to retract due to a system bleed or other vacuum pull on the plug body.

The sealing plug can be removed essentially in a reverse manner. The plug body can be pushed inwardly against the biasing force of the resilient member to permit removal of the retainer 48. With the retainer removed, the plug body and spring retainer can be axially pulled from the opening. To facilitate this, the plug body 40 may have at its axially outer end a catch 82 including at least one transverse slot 80 (formed as an undercut, for example) for receiving a hook (key) end of a withdrawal tool (not shown) to enable the plug body to be pulled out of the opening after removal of the retainer 48. Of course other means may be used to withdraw the plug body from the opening.

The herein described parts may be made of any suitable material. For example, the manifold 34 can be made of many materials such as aluminum, steel, and titanium. The plug body and spring retainer typically will be made of aluminum for most hydraulic applications. The applications for the sealing plug are many, including for example any pressurized manifold or vessel, whether it is hydraulic, pneumatic, or any other means.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

The invention claimed is:

1. A sealing plug for sealing an opening in a part, comprising a plug body insertable into the opening for closing the opening; an annular sealing member circumscribing the plug body for sealing to a wall of the part surrounding the opening to prevent the passage of fluid through the opening past the plug body; a backstop having a radially outward flange portion disposed axially inwardly of an axial inner end of the plug body for engaging an axially outwardly facing shoulder surface of the part; and a resilient member interposed between the backstop and the plug body for resiliently biasing the plug body axially outwardly; wherein the plug body has a radially inwardly stepped end forming an axially outwardly facing stop surface for engaging a retainer engaged in and protruding from a radially inwardly opening retainer groove in wall of the part and an axially extending locking surface for preventing the retainer from moving radially inwardly to an extent that would allow retainer to disengage from the retainer groove; and the resilient member resiliently biases the plug body from an axial release position for allowing the retainer to be engaged in or disengaged from the retainer groove to an axial locking position for locating the locking surface radially inwardly of the retainer to prevent its removal from the retainer groove.

2. The sealing plug of claim 1, wherein the backstop is coupled to the plug body for limited relative axial movement.

3. The sealing plug of claim 2, wherein the backstop has a stem extending axially outwardly from the flange portion and telescopically movable in the plug body, stem having a reduced neck portion and an axially outer head portion forming with the reduced neck portion an axially inwardly facing abutment surface, and the plug body has a larger diameter interior chamber and a reduced diameter neck portion between the interior chamber and the axial inner end face of the plug body that form an axially outwardly facing abutment surface for engaging the axially inwardly facing abutment surface of the backstop for holding the backstop to the plug body while permitting relative movement therebetween.

4. The sealing plug of claim 3, wherein the reduced diameter neck portion of the plug body is internally threaded and the axially outer head portion of the stem is correspondingly internally threaded, whereby the outer head portion of the stem can be threaded into and through the reduced diameter neck portion of the plug body whereby the outer head portion of the stem can be located within the larger diameter interior chamber of the plug body for limited axial movement therein.

5. The sealing plug of claim 1, wherein the annular sealing member is a resilient sealing member.

6. The sealing plug of claim 1, wherein the annular sealing member is an O-ring.

7. The sealing plug of claim 1, wherein the radially outward flange portion is an annular flange.

8. The sealing plug of claim 1, wherein the plug body has at its axially outer end a transverse slot for receiving a hook end of a withdrawal tool to enable the plug body to be pulled out of the opening after removal of the retainer.

9. The sealing plug of claim 1, wherein the retainer includes one or more arcuate retainer segments.

10. The sealing plug of claim 1, wherein the retainer groove is a circumferentially continuous groove.

11. The sealing plug of claim 1, wherein the retainer includes one or more arcuate segments having a circular cross-sectional shape of a given radius, and the stepped end of the plug body defines a radius essentially equal the given radius of the one or more arcuate segments.

12. The sealing plug of claim 1, wherein the resilient member is a spring.

13. The sealing plug of claim 1, wherein the plug body is unitary.

14. The sealing plug of claim 1, wherein the backstop has one or more through passages for allowing fluid to pass from one side of the backstop to the other to allow pressurized fluid in the opening to act on the plug body to assist in holding the plug body in its axial locking position.

15. The sealing plug of claim 1, in combination with the part and the retainer, with the retainer being engaged in the retainer groove, the backstop engaging the axially outwardly facing shoulder surface of the part, and the plug body being resiliency held by the resilient member in its axial locking position for locating the locking surface radially inwardly of the retainer to prevent its removal from the retainer groove.

16. A method of installing a sealing plug in an opening in a part for sealing the opening, comprising the steps of inserting a plug body into the opening for closing the opening, with an annular sealing member circumscribing the plug body for sealing to a wall of the part surrounding the opening to prevent the passage of fluid through the opening past the plug body; pushing the plug body further into the opening against a resilient member to allow a retainer to be engaged in a radially opening slot in the part with a portion of the resilient member protruding radially inwardly; releasing the plug body to allow the resilient member to move the plug body to a position against the retainer, the plug body having a radially inwardly stepped end forming an axially outwardly facing stop surface for engaging the retainer to retain the plug body in the fluid member, and an axially extending locking surface that moves radially inwardly of the retainer to prevent the retainer from moving radially inwardly to an extent that would allow retainer to disengage from the retainer groove.

17. The method of claim 16, wherein the retainer includes one or more arcuate segments that are positioned in the retainer groove and the retainer groove is a circumferentially continuous groove.

18. A spring-energized plug assembly for a manifold lug having a central passageway with a blind end bore having an outer end and an annular shoulder inwardly spaced from the outer end, where the plug assembly comprises i) a spring retainer having an elongated annular body portion with a central passage, and an enlarged head configured to fit closely against the annular shoulder within the passageway, ii) a plug portion including an annular body portion with a central cavity configured to receive the body portion of the spring retainer, the spring retainer and plug portion including means for retaining these components together, and a spring located between the spring retainer and the plug portion and biasing these components away from one another into a normal configuration, but allowing them to be compressed together, the plug portion including an external annular channel circumscribing the body portion of the plug portion and a resilient annular seal located in the external channel for sealing against internal walls of the passageway, wherein the passageway includes a retaining ring groove toward the outer end of the passageway, and the plug assembly can be located in the passageway and compressed to allow access to the retaining ring groove for locating a retaining means in the groove, with the retaining means sized so as to abut the plug portion when the plug assembly returns to its normal configuration, whereby the plug assembly is retained in the passageway by the retaining means.

* * * * *